Figure 1:
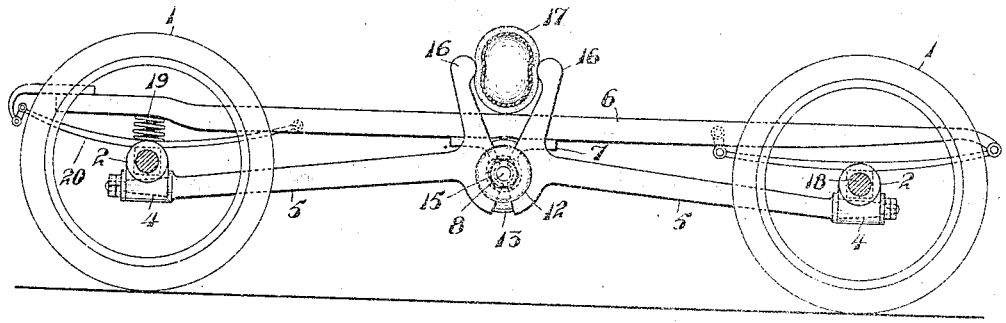

A. J. PETTER.
VEHICLE FRAME.
APPLICATION FILED JUNE 27, 1912.

1,085,995.

Patented Feb. 3, 1914.
2 SHEETS—SHEET 1.

WITNESSES
H. C. Fliedner
Harry H. Totten

INVENTOR
A. J. Petter
BY
ATTORNEY

A. J. PETTER.
VEHICLE FRAME.
APPLICATION FILED JUNE 27, 1912.

1,085,995.

Patented Feb. 3, 1914.
2 SHEETS—SHEET 2.

UNITED STATES PATENT OFFICE.

ADOLPH J. PETTER, OF LOS ANGELES, CALIFORNIA.

VEHICLE-FRAME.

1,085,995.   Specification of Letters Patent.   Patented Feb. 3, 1914.

Application filed June 27, 1912. Serial No. 706,203.

*To all whom it may concern:*

Be it known that I, ADOLPH J. PETTER, a citizen of the United States, residing at Los Angeles, in the county of Los Angeles and State of California, have invented certain new and useful Improvements in Vehicle-Frames, of which the following is a specification.

The hereinafter described invention relates to an improved jointed frame construction or running gear, adapted for use in connection with all types of vehicles, but is more particularly adapted for motor vehicles, and has for its principal object to provide a vehicle body supporting frame so constructed that all road shocks will be absorbed or equalized thereby before the same are transmitted to the vehicle body, so that the vehicle occupants will not be jarred and jolted as the vehicle wheels encounter rough or uneven surfaces.

A further object is to provide a frame of the above mentioned type which will absorb each road shock as it is independently transmitted thereto by the various vehicle supporting wheels.

Other and important objects are to provide a device of the above mentioned type in which the flexibility of the shock absorbing medium may be varied according to the load carried by the vehicle or the road over which the vehicle is to travel, and one in which the shocks received by the supporting wheels will be equally distributed throughout the frame.

The invention consists of a pair of alined side members extending parallel to each other and providing a vehicle frame, each side member formed of a plurality of sections pivoted together at their ends, the outer ends of the end sections carrying the vehicle supporting wheels, brackets supporting the vehicle body above the frame and connected thereto at the pivotal points thereof, and resilient means associated with the pivotal points of the sections for compensating and absorbing the road shocks transmitted from the vehicle wheels before the same are transmitted to the vehicle body.
With the above mentioned and other objects in view, the invention consists in the construction and novel combination of parts hereinafter fully described, illustrated in the accompanying sheets of drawings, and pointed out in the claims hereto appended; it being understood that various changes in the form, proportion, size and minor details of construction, within the scope of the claims, may be resorted to without departing from the spirit or sacrificing any of the advantages of the invention.

Figure 2:
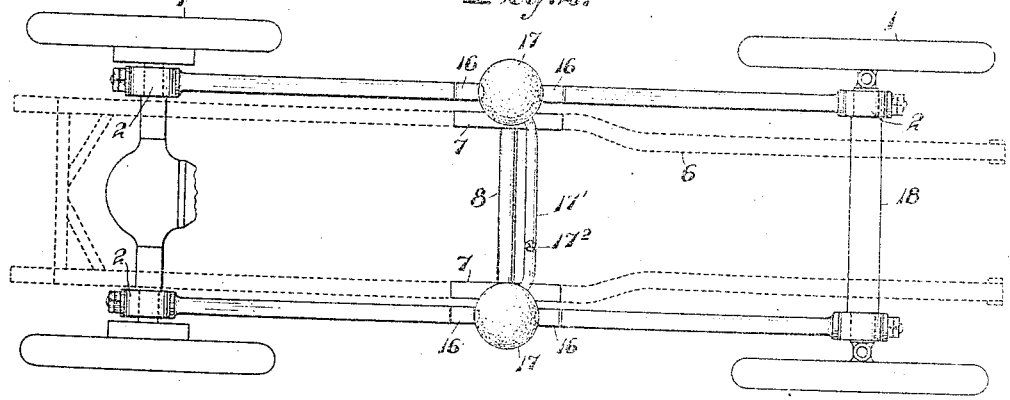
Figure 3:
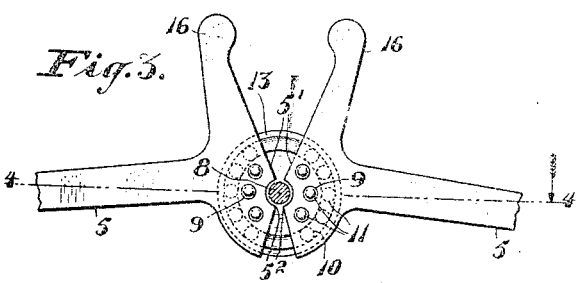
Figure 4:
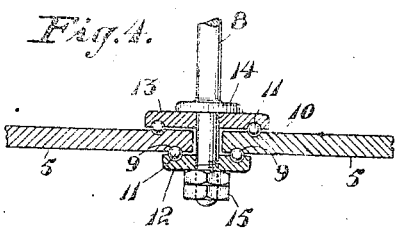
Figure 5:
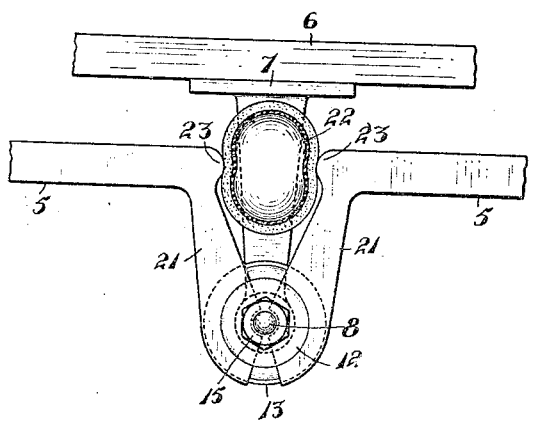
Figure 6:
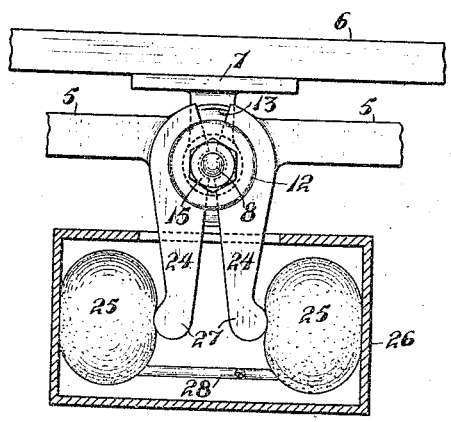
Figure 7:
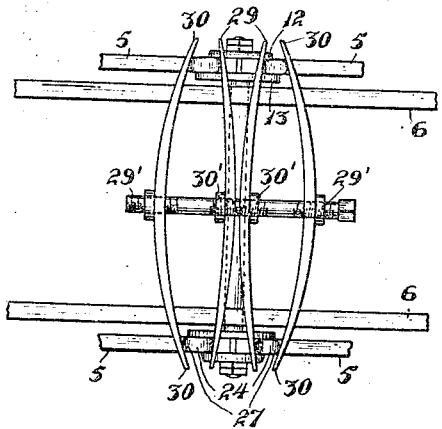
Figure 8:
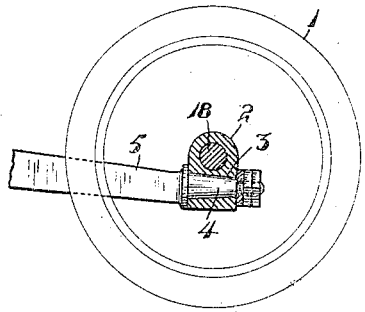

In the drawings:—Figure 1 is a side elevation of my improved frame construction, disclosing one of the side frame members, the sections forming the same, the brackets supporting the vehicle body, and the shock absorbing and equalizing means associated with the sections at their pivotal points. Fig. 2 is a top plan view of my improved device with the vehicle body disclosed in dotted lines. Fig. 3 is a side elevation of one of the joints of the pivotal sections with the washers removed, disclosing the annular grooves in which the antifriction bearings are seated. Fig. 4 is a longitudinal sectional view taken on line 4—4—Fig. 3, disclosing the position of the annular grooves and the rings or balls retained therein between the plates. Fig. 5 is a modified form of construction of the meeting ends of the sections and disclosing the pneumatic or other shock absorbing devices between the projecting ends thereof. Fig. 6 is another modified form of section end construction and disclosing a pair of pneumatic absorbing devices positioned to equalize outward movement of the ends of the sections. Fig. 7 is a modified form of spring equalizer applied to the ends of the sections, disclosed in Fig. 6. Fig. 8 is a detail view of the mounting of the wheel supporting spindles onto the outer ends of the end sections.

Referring more particularly to the drawings, the reference numeral 1 designates the vehicle supporting wheels carried on a spindle extending from a casting 2 which is provided with a conical opening 3 through which is adapted to extend a conically shaped spindle 4 formed at the outer free end of the side sections 5 forming the vehicle frame.

The sections 5 extend longitudinally of a vehicle body 6 adjacent the sides thereof and support the same by means of a plurality of brackets 7, the upper ends of which are attached to the underside of the vehicle body and the lower ends of the brackets resting on transversely extending rod 4 which provides a point about which the meeting end portions of the side sections 5 pivot. The meeting ends of the side sections 5 are beveled or flared inwardly as at 5' provide ing a contacting point 5² which is adapted to rest against the rod 8 and pivot thereabout. The side sections 5 are provided on their side faces adjacent the meeting ends thereof with suitable circularly arranged seats 9 and 10, the seats 10 forming a larger circle than the seats 9 and in which seats are adapted to be seated suitable bearings 11, the same being retained therein between the plates 12 and 13, the plates 13 abutting against collars 14 on the rod 8 and the plates being retained in frictional engagement with the opposite sides of the frame sections by the retaining nuts 15 which fit onto the ends of the rod 8, and from the above construction it will be observed that an anti-friction bearing is provided at the meeting ends of the side sections and the tension of the same may be varied by the adjustment of the nuts 15.

Extending laterally from the side sections at their meeting ends are suitable inclined arms 16 between the ends of which is adapted to be positioned an inflatable or other form of resilient member or buffer 17 the resiliency of which will equalize and absorb the road shocks as they are transmitted thereto through the side frame sections 5. The buffers are connected together by a suitable tube 17′, and a common inflation valve 17² is provided, so that both buffers may be inflated to the same pressure and when one is compressed the air therein will escape to the other buffer.

The castings 2 are connected by a transversely extending rod 18, which serves to maintain the wheels in alinement and suitable coiled and leaf springs 19 and 20 are provided intermediate the ends of the vehicle body 6 and the castings 2.

In Fig. 5 the side members 5 are provided with angularly extending arms 21 which are pivoted together in the above described manner at their lower ends and an equalizing buffer 22 is positioned in the recess formed by the inclined extending arms 21 and is adapted to be engaged by suitable lugs 23 extending from the side sections at the juncture of the arms 21. The supporting wheels may be attached to the ends of the side sections in this figure as they are in Figs. 1 and 2, and it will be observed that a shock absorbing and equalizing frame is provided which will accomplish the same results as that disclosed in Figs. 1 and 2.

Fig. 6 is a further modified form wherein the pivotal point of the side sections is in a plane with the body of the sections, and from the ends of the sections project downwardly the arms 24. To the outer ends of the sections are attached the supporting wheels as in Figs. 1 and 2, and it will be observed from this structure that the arms 24 will be moved outwardly upon the supporting wheels striking uneven surfaces and these shocks are absorbed by a pair of inflatable buffers 25 retained within a casing 26 between the end walls thereof, and projections 27 on the lower ends of the arms 24. These buffers are connected together by a suitable tube 28 so that upon one being compressed the air therein will be forced into the other buffers.

In Fig. 7 is disclosed a form of spring buffer adapted for use in a construction where suitable arms project from the end of the side sections 5, the sections being pivoted in the same manner as in Figs. 1 and 2. A pair of convex buffer springs 29 are interposed between the inner faces of the ends of the arms, and a pair of concave buffer springs 30 engage the outer faces of the ends of the arms, the tension of the respective pairs of springs being regulated by the oppositely screw threaded members 29′ and 30′ which extend into suitable screw threaded openings in the springs.

From the above constructions it will be observed that a vehicle frame has been provided which will receive and absorb the shocks before the same are transmitted to the vehicle body. It will also be observed that the equalizing buffers may be used separately or several be combined in a vehicle, it only requiring that the meeting ends of the side sections be the same.

Having thus fully described my invention what is claimed as new and desired to be protected by Letters Patent is—

1. In a shock absorbing and equalizing frame for vehicles and in combination with the vehicle body and supporting wheels thereof, a plurality of alined side sections arranged in pivotal relation at their meeting ends and forming a body supporting frame, brackets carried by the vehicle body, a shaft extending through said brackets and about which said side sections pivot, disks positioned over said shaft and engaging the opposite side faces of the side section for retaining their meeting ends in pivotal engagement, devices pivotally mounted on the free ends of said side sections for attachment to said vehicle supporting wheels, and buffers associated with the side sections of said supporting frame adjacent the pivotal points for equalizing and absorbing the road shocks received from the vehicle supporting wheels before the same are transmitted to the vehicle body.

2. In a shock absorbing and equalizing frame for vehicles and in combination with the vehicle body and supporting wheels thereof, a plurality of alined side sections arranged in pivotal relation at their meeting ends and providing a body supporting frame, disks engaging the opposite side faces of the side sections for retaining their meeting ends in pivotal engagement, devices pivotally mounted on the free ends of said side sections for attachment to said vehicle supporting wheel, means associated with the pivotal points of said side sections for supporting said vehicle body, arms projecting from the side sections adjacent their pivotal points, and buffers acted on by said arms, said buffers adapted to equalize and absorb the road shocks received from the vehicle supporting wheels before the same are transmitted to the vehicle body.

3. In a shock absorbing and equalizing frame for vehicles and in combination with the vehicle body and supporting wheels thereof, a plurality of alined side sections arranged in pivotal relation at their meeting ends, and provided with circularly arranged seats in the opposite side faces thereof, anti-friction devices positioned on said seats, a shaft secured to and depending from the vehicle body and about which said side sections pivot, disks fitted over said shaft for clamping said anti-frictional devices in said seats, said disks positioned at the opposite side faces of the side sections and adapted with the anti-friction devices for retaining the meeting ends of said side sections in pivotal engagement, devices pivotally mounted on the free end of said side sections for attachment to said vehicle supporting wheels, arms projecting from the side sections adjacent their pivotal points, and buffers acted on by said arms and adapted to equalize and absorb the road shocks received from the vehicle supporting wheels before the same are transmitted to the vehicle body.

In testimony whereof I have signed my name to this specification in the presence of two subscribing witnesses.

ADOLPH J. PETTER.

Witnesses:
HARRY H. TOTTEN,
D. B. RICHARDS.